United States Patent [19]

Chieng et al.

[11] Patent Number: 5,006,172
[45] Date of Patent: Apr. 9, 1991

[54] INK-JET INKS FOR THE MARKING OF PLASTICS

[75] Inventors: Ching K. Chieng, Bukit Merah Central, Singapore; Charles L. Thierheimer, Jr., Corvallis, Oreg.

[73] Assignee: Hewlett-Packard Company, Palo Alto, Calif.

[21] Appl. No.: 395,224

[22] Filed: Aug. 17, 1989

[51] Int. Cl.⁵ .............................................. C09D 11/02
[52] U.S. Cl. ........................................ 106/22; 106/20
[58] Field of Search .............................. 106/20, 22, 19

[56] References Cited

U.S. PATENT DOCUMENTS

| | | | |
|---|---|---|---|
| 3,961,965 | 6/1976 | Zwahlen | 106/22 |
| 4,070,322 | 1/1978 | Hwang et al. | 106/22 |
| 4,210,566 | 7/1980 | Murray | 106/22 |
| 4,325,735 | 4/1982 | Ohta et al. | 106/22 |
| 4,395,287 | 7/1983 | Kobayashi et al. | 106/22 |
| 4,567,213 | 1/1986 | Bhatia et al. | 106/22 |
| 4,677,445 | 6/1987 | Haruta | 106/22 |
| 4,732,613 | 3/1988 | Shioya et al. | 106/22 |
| 4,756,758 | 7/1988 | Lent et al. | 106/22 |
| 4,892,775 | 1/1990 | Song | 106/22 |

*Primary Examiner*—Mark L. Bell
*Assistant Examiner*—Helene Klemanski

[57] ABSTRACT

New inks for thermal ink-jet printers are formulated by replacing all or a large percentage of the aqueous component in prior art inks with an organic liquid which can adhere to, dissolve, swell, or penetrate a plastic film and also act as a solvent for the dyestuff in the ink. Present in the inks is a small percentage of a jetting agent. With these inks, a wide variety of plastic films can be marked with an ink-jet printer. The printed ink is water-fast, smear resistant, and substantially indelible.

28 Claims, No Drawings

INK-JET INKS FOR THE MARKING OF PLASTICS

TECHNICAL FIELD

This invention is concerned with new thermal ink-jet inks that are useful for marking a wide range of plastics. The aqueous component of prior art inks can be largely or entirely replaced by organic components in which the dye-stuff is soluble and which can adhere to, dissolve, swell, or penetrate the plastic material. Markings on plastics with these inks have good water-fastness, smear resistance, and a high degree of indelibility.

BACKGROUND ART

Recording inks, comprising a dye, a large proportion of water, and water-miscible solvents, have been used in thermal ink-jet printers. Such inks, however, must meet rather stringent requirements. For example, they should be stable over a prolonged period, have the correct viscosity, conductivity, and surface tension, and also rapidly fix onto the recording surface. Further, the resultant image should be clear and have good fastness to light and water.

The vehicles used in the foregoing formulations are generally mixtures containing significant amounts of water. Such formulations, however, cannot be used effectively to mark plastics; they smear, blur, and/or wash off easily. Presently, plastics used in keyboard keycaps are either marked by printing a template, pressing the template against a plastic substrate, and heating the combination to a temperature from about 150° to about 250° C., or by sublimation method. All these requires plastics that retain their dimensionality at the elevated temperature. In contrast, the present invention involves direct printing and avoids heating and the need for a template.

DISCLOSURE OF INVENTION

In accordance with the present invention, a new class of printing inks has been formulated. These inks are particularly effective in printing on a wide range of plastic materials with ink-jet printers. The inks comprise, by weight, from about 1% to about 10% dyestuff, from about 1% to about 25% jetting agent, and the balance being substantially a water-miscible organic solvent for the dyestuff. The organic solvent preferably contains two to four components and is capable of adhering to, dissolving, swelling, or penetrating the plastic material which is to be marked. The printed inks evidence water-fastness, are smear resistant, and are indelible.

BEST MODES FOR CARRYING OUT THE INVENTION

The dyestuff is present in an amount ranging from about 1 to about 10 wt %, and preferably about 2 to about 4 wt %; a level of about 2.5 wt % is particularly effective. A wide range of dyestuffs is useful, both black and other colors. For example, Morfast Ink Black B, Solvent Black 46, Morfast Red 102, Endorsing Ink, Morfast Yellow 102, Morfast Blue 100, Morfast Red 106, Automate Green 1, Artificial Cochineal Color (food dye) and Morfast Automate Red B can be employed. Many of these dyestuffs are available commercially as 50% dyestuff and 50% solvent, such as 1-propanol or ethylene glycol phenyl ether.

There should be enough jetting agent in the final formulation to provide bubbles of ink at the printhead to cause the ink to jet onto the printing medium. Jetting behavior is a complex function of the critical pressure, volume, temperature characteristics, and mole fraction of the agent in the ink solution. The jetting agent may be water and/or an organic liquid, which has a boiling point from about 50° C. to about 200° C., preferably from about 50° C. to about 150° C. If the jetting agent is an organic liquid, it should be miscible with the water-miscible organic solvent for the dyestuff. Examples of organic jetting agents are methanol, ethanol, n-propanol, isopropanol, ethyl acetate, methyl ethyl ketone, methyl isobutyl ketone, ethoxyethanol, and propylene glycol methyl ether.

If the jetting agent is water, up to about 25 wt % may be used, but from about 1 wt % to about 10 wt %, preferably from about 4 wt % to about 6 wt %, is desirable. If more than about 10 wt % water is employed, it tends to interfere with the penetration of the ink into the plastic, and the indelibility of the ink is adversely affected.

If the jetting agent is organic, about 1 wt % to about 25 wt %, preferably from about 5% to about 15%, may be employed. Mixtures of organic agent and water are also within the scope of this invention.

The vehicle solvents are chosen with certain characteristics in mind. It is not necessary that each possible pair of vehicle solvents be water-miscible, only that the final mixture be a homogeneous solution. In addition, the organic solvent should be a solvent for the dyestuff. Most importantly, the organic solvent should be capable of adhering to, dissolving, swelling, or penetrating the plastic printing medium. Since it is intended to print a wide range of plastics with the inks of this invention, the organic solvent must be selected with the particular plastic in mind.

The solvents used in this invention will generally have boiling points from about 50° C. to about 200° C., preferably from about 50° C. to about 150° C. Among suitable organic solvents are alkyl glycol ethers, wherein the alkyl radical has up to 4 carbon atoms, aromatic hydrocarbons, alkyl pyrrolidones, ketones, and lactones. Particular examples of suitable solvents include dipropylene glycol and other common glycols, diethylene glycol methyl ether, dipropylene glycol methyl ether, N-methyl pyrrolidone, N-ethyl pyrrolidone, phenoxy ethanol, methyl ethyl ketone, methyl iso-butyl ketone, cyclohexanone, and δ-butyrolactone. The solubility parameters of the materials can be determined according to the *Handbook of Solubility Parameters and Other Cohesion Parameters*, Allan F.M. Barton, CRC Press, Inc., Boca Raton, FL (1983).

In determining the solvent mixture, it is important to characterize the surface of the plastic in terms of its solubility parameter. Then, a solvent is selected which has a solubility parameter most like that of the plastic. This technique is well-known in the polymer and paint industries, and accordingly requires no undue experimentation.

The viscosity of the final formulation must be adjusted to meet the constraints of the printhead. The viscosity is preferably between about 1 cp and about 20 cps at 25° C. Drying time is primarily related to the vapor pressure-temperature characteristics of the solvent mixture. The larger the vapor pressure(s) of the vehicle solvents, the smaller the drying time. If, however, the drying time is too short, then the ink will dry in the nozzles of the printhead and clog them.

These vehicles carry the dye into the surface of the plastic. The solvent vehicles are determined by the plastic. After the solvent/plastic combination is resolved, a dyestuff that is compatible with the vehicle is selected.

In order to optimize the vehicle, the contact angle of the drops of ink on the plastic surface should be checked. At normal room temperature, the contact angle should be between about 40° and 70°. If the contact angle is less than about 40°, then the dots tend to have ragged edges and the print will have poor resolution. If the contact angle exceeds about 70°, the dots are very small and the printed characters have poor darkness and the permanence is impaired. Instruments for determining dot angles are available; for instance, Rame-Hart has a device that it calls NRL Contact Angle Goniometer.

The inks of the present invention are preferably used to mark thermoplastics, although they can also be used on thermosetting materials. Because of the cross-linking in thermosetting materials, the solvent penetration possibly will be more difficult and the indelibility somewhat less than with thermoplastics.

INDUSTRIAL APPLICABILITY

The ink compositions of the invention are expected to find use in marking a wide variety of plastics by ink-jet printing.

EXAMPLES

In order to further illustrate the invention, some practical illustrations are now set forth.

EXAMPLE 1

Polyethylene terephthalate glycol (PETG) film was printed with a Hewlett-Packard DeskJet ink cartridge pen (DeskJet is a trademark of Hewlett-Packard Company), using an ink of the following formulation:

| | |
|---|---|
| dipropylene glycol | 2.8 wt % |
| γ-butyrolactone | 87.2 wt % |
| water | 5.0 wt % |
| Morfast Ink Black B | 5.0 wt % |

Sharp, clear numbers and letters were obtained.

EXAMPLE 2

Polycarbonate film was printed with a Hewlett-Packard DeskJet ink cartridge pen, using an ink of the following formulation:

| | |
|---|---|
| phenoxyethanol | 4.3 wt % |
| γ-butyrolactone | 85.7 wt % |
| water | 5.0 wt % |
| Morfast Ink Black B | 5.0 wt % |

Sharp, clear numbers and letters were obtained.

EXAMPLE 3

In another run, ABS film was printed with a ThinkJet pen (ThinkJet is a trademark of Hewlett-Packard Company), using the following formulation:

| | |
|---|---|
| N-methylpyrrolidone | 79.55 wt % |
| N-cyclohexylpyrrolidone | 10.45 wt % |
| water | 5.00 wt % |
| Morfast Ink Black B | 5.00 wt % |

Sharp, clear characters were obtained.

EXAMPLE 4

A formulation of

| | |
|---|---|
| N-methylpyrrolidone | 80 wt % |
| N-cyclohexylpyrrolidone | 10 wt % |
| deionized water | 5 wt % |
| Solvent Black 46 | 5 wt % |
| (50% dye and 50% 1-propanol) | | was printed on low cost engineering thermoplastics with the following results:

| | |
|---|---|
| polycarbonate | acceptable to good |
| polyvinyl chloride | good to excellent |
| ABS | good to excellent |
| ABS/polycarbonate blend | good to excellent |
| PBT | acceptable to good |
| PETG | acceptable to good |

ABS = acrylonitrile-butadiene-styrene;
PBT = polybutylene terephthalate;
ABS/polycarbonate blend = nominally 50/50 parts by weight mixture of ABS and polycarbonate.

EXAMPLE 5

A formulation of

| | |
|---|---|
| N-ethylpyrrolidone | 75 wt % |
| N-cyclohexylpyrrolidone | 15 wt % |
| deionized water | 5 wt % |
| Solvent Black 46 | 5 wt % | was printed on engineering grade thermoplastics with the following results:

| | |
|---|---|
| polycarbonate | acceptable |
| polyvinyl chloride | good |
| ABS/polycarbonate blend | good |
| ABS | good to excellent |
| PBT and PETG | unacceptable |

EXAMPLE 6

A formulation of

| | |
|---|---|
| cyclohexanone | 71% |
| N-cyclohexyl pyrrolidone | 24% |
| Solvent Black 46 | 5% | was printed on engineering grade thermoplastics with the following results:

| | |
|---|---|
| polycarbonate | good |
| polyvinyl chloride | acceptable to good |
| ABS | good |
| ABS/polycarbonate blend | good to acceptable |
| PBT and PETG | unacceptable |

EXAMPLE 7

A formulation of

| | |
|---|---|
| cyclohexanone | 90% |
| methyl ethyl ketone | 5% |
| Solvent Black 46 | 5% | was printed on engineering grade thermoplastics with the following results:

| | |
|---|---|
| polycarbonate | acceptable |
| polyvinyl chloride | good |
| ABS | acceptable to good |
| ABS/polycarbonate blend | good |
| PBT | unacceptable |

EXAMPLE 8

A formulation comprising, by weight,

| | |
|---|---|
| Morfast Red 102 | 5% |
| ethylene glycol phenyl ether | 5% |
| γ-butyrolactone | 77% |
| methyl ethyl ketone | 10% |
| water | 3% | was used to mark ABS plastic with excellent results.

EXAMPLE 9

A formulation comprising, by weight,

| | |
|---|---|
| Endorsing Ink | 5% |
| ethylene glycol phenyl ether | 5% |
| γ-butyrolactone | 77% |
| methyl ethyl ketone | 10% |
| water | 3% |

EXAMPLE 10

A formulation comprising, by weight,

| | |
|---|---|
| Morfast Automate Red B | 5% |
| ethylene glycol phenyl ether | 4% |
| γ-butyrolactone | 81% |
| isopropyl alcohol | 10% |

What is claimed is:

1. In a method of printing plastics with a thermal ink-jet printer, said plastic having a given solubility parameter, the improvement consisting of printing an ink onto the surface of said plastic, said ink consisting essentially by weight:
   (a) from about 1% to about 10% dyestuff;
   (b) from about 1% to about 25% jetting agent, comprising at least one component selected from the group consisting of water and an organic liquid;
   (c) the balance being substantially at least one organic solvent which is capable of dissolving, swelling, or penetrating the plastic material and which is a solvent for said dyestuff, said at least one organic solvent also having a given solubility parameter, said solubility parameter of said at least one solvent being comparable to that of said plastic.
said printing being performed at a contact angle relative to said plastic surface of about 40° to 70°.

2. The method of claim 1 wherein said plastic is polyethylene terephthalate glycol.

3. The method of claim 1 wherein said plastic is acrylonitrile-butadiene-styrene.

4. The method of claim 1 wherein said plastic is polycarbonate.

5. The method of claim 1 wherein said plastic is polyvinyl chloride.

6. The method of claim 1 wherein the plastic is a blend of about 50% polycarbonate and about 50% acryloni-trile-butadiene-styrene.

7. The method of claim 1 wherein the plastic is polybutylene terephthalate.

8. The method of claim 1 wherein said dyestuff comprises about 2 to about 4 wt % of said ink.

9. The method of claim 8 wherein said dyestuff comprises about 2.5 wt % of said ink.

10. The method of claim 1 wherein said jetting agent is water and constitutes from about 1 to about 10 wt % of said ink.

11. The method of claim 10 said jetting agent is water and constitutes from about 4 to about 6 wt % of the ink.

12. The method of claim 1 wherein said jetting agent is an organic liquid having a boiling point from about 50° C. to about 200° C.

13. The method of claim 12 wherein said jetting agent is an organic solvent having a boiling point from about 50° C. to about 150° C.

14. The method of claim 1 wherein said jetting agent is a member selected from the group consisting of methanol, ethanol, 1-propanol, isopropanol, ethyl acetate, methyl ethyl ketone, methyl isobutyl ketone, ethoxyethanol, and propylene glycol methyl ether.

15. The method of claim 1 wherein said jetting agent is a mixture of water and an organic liquid having a boiling point from about 50° C. to about 200° C.

16. The method of claim 1 wherein said ink contains about 5 wt % of an organic liquid which boils from about 50° C. to about 150° C.

17. The method of claim 1 wherein said organic solvent is a mixture of two to four components.

18. The method of claim 1 wherein said organic solvent is a member selected from the group consisting of alkyl glycols, wherein alkyl has from 1 to about 4 carbon atoms, aromatic hydrocarbons, ketones, alkyl pyrrolidones, and lactones.

19. The method of claim 11 said ink comprises about 5 wt % Morfast Ink B, about 3 wt % dipropylene glycol, about 87 wt % γ-butyrolactone, and about 5 wt % water.

20. The method of claim 1 wherein said ink comprises about 5 wt % Morfast Ink Black B, about 4 wt % phenoxyethanol, about 86 wt % γ-butyrolactone, and about 5 wt % water.

21. The method of claim 1 wherein said ink comprises about 5 wt % Morfast Ink Black B, about 80 wt % N-methylpyrrolidone, about 10 wt % N-cyclohexylpyrrolidone, and about 5 wt % water.

22. The method of claim 1 wherein said ink comprises about 5 wt % Solvent Black 46, about 80 wt % N-methylpyrrolidone, about 10 wt % N-cyclohexylpyrrolidone, and about 5 wt % water.

23. The method of claim 1 wherein said ink comprises about 5 wt % Solvent Black 46, about 75 wt % N-ethylpyrrolidone, about 15 wt % N-cyclohexylpyrrolidone, and about 5 wt % water.

24. The method of claim 1 wherein said ink comprises about 5 wt % Morfast Red 102, about 5 wt % ethylene glycol phenyl ether, 77 wt % γ-butyrolactone, about 10 wt % methyl ethyl ketone, and about 3 wt % water.

25. The method of claim 1 wherein said ink comprises about 5 wt % of Endorsing Ink, about 5 wt % ethylene glycol phenyl ether, about 77 wt % γ-butyrolactone, about 10 wt % methyl ethyl ketone, and about 3 wt % water.

26. The method of claim 1 wherein said ink comprises about 5 wt % Morfast Automate Red B, about 4 wt % ethylene glycol phenyl ether, about 81 wt % γ-butyrolactone, and about 10 wt % isopropyl alcohol.

27. The method of claim 1 wherein said dye stuff is water soluble.

28. The method of claim 1 wherein said dyestuff is soluble in an organic solvent.

* * * * *